United States Patent [19]

Hawkins

[11] Patent Number: 4,851,498

[45] Date of Patent: Jul. 25, 1989

[54] THERMOPLASTIC MOLDING RESINS HAVING DICYCLOPENTADIENYL DERIVATIVE RADICAL IN POLYMER BACKBONE

[75] Inventor: Christopher M. Hawkins, Evansville, Ind.

[73] Assignee: General Electric Company, Mt. Vernon, Ind.

[21] Appl. No.: 133,857

[22] Filed: Dec. 16, 1987

[51] Int. Cl.$^4$ .................. C08G 63/52; C08G 63/62; C08G 63/64
[52] U.S. Cl. ............................. 528/190; 528/173; 528/176; 528/192; 528/201; 528/205; 528/212
[58] Field of Search ............... 528/190, 192, 173, 176, 528/201, 205, 212

[56] References Cited

U.S. PATENT DOCUMENTS 4,233,432  11/1980  Curtis .................... 528/298

OTHER PUBLICATIONS

Miura, et al., Bulletin of the Chemical Society of Japan, vol. 50, No. 10, pp. 2682–2685 (1977).
Kennedy and Castner, Journal of Polymer Science, vol. 17, No. 7, p. 2039 and pp. 2055 (1979).

Primary Examiner—Harold D. Anderson
Attorney, Agent, or Firm—Martin Barancik

[57] ABSTRACT

Novel thermoplastic polymer compositions such as aromatic polycarbonates, aromatic copoly(ester carbonate)s, polyarylates, poly(arylene oxide)s, and polyarylether sulfones containing dicyclopentadienyl diradicals and method for manufacture. The modified polymer compositions have improved melt flow properties.

15 Claims, No Drawings

THERMOPLASTIC MOLDING RESINS HAVING DICYCLOPENTADIENYL DERIVATIVE RADICAL IN POLYMER BACKBONE

FIELD OF THE INVENTION

This invention is concerned with novel molding resins and with their preparation. In particular, it is concerned with thermoplastic molding resins that tend to be difficult to mold, such as the polycarbonates, the copoly(ester-carbonate)s, the poly(arylene oxide)s and the polysulfones.

BACKGROUND OF THE INVENTION

Modern thermoplastic molding resin compositions, depending on the molecular composition of the polymer and on its molecular weight, offer the molder a range of materials with surprisingly good physical properties for use in difficult environments, such as at elevated temperatures. A number of such materials, however, require unusually high fabrication temperatures for efficient processing, such as melt temperatures above 600° F. for injection molding. Because resin manufacturers are constrained to market only grades of resin that can be processed in available equipment, this constraint leads to practical compromises in ultimate physical properties. This problem can be better illustrated, for example, by reference to a specific type of polycarbonate resins.

2,2 bis-(p-hydroxyphenyl)propane polycarbonate (hereinafter referred to as bisphenol-A polycarbonate) is a well known thermoplastic polymer offering good thermal stability, excellent dimensional stability and resistance to creep under load. Injection molding grades of bisphenol-A polycarbonate have intrinsic viscosities (as measured in methylene chloride at 30° C.) in the range of about 0.40 to 0.55 dl/g. A typical polymer in that viscosity range has a weight-average molecular weight of about 30,000, and a number-average molecular weight of about 11,000. The mechanical properties of bisphenol-A polycarbonate increase very rapidly with increased intrinsic viscosity until the intrinsic viscosity reaches about 0.40, and then taper off. The melt viscosity of the resin, however, increased rapidly at intrinsic viscosities greater than about 0.45, and at intrinsic viscosities of about 0.6 the melt viscosity is already sufficiently high that injection molding with complex molds becomes quite difficult. Practical commercial molding grades therefore must be constrained to molecular weights that provide a resin with sufficient fluidity at molding temperature but with less than maximum physical properties.

It has now been found that insertion of small quantities of cyclopentadiene or cyclopentadiene-type dicarboxylic acid groups with these resins brings about processing advantages without significant loss of properties.

The synthesis of 1:1 polyesters of dicyclopentadiene dicarboxylic acid with bis-(p-hydroxyphenyl)ether and with 2,2-bis-(p-hydroxyphenyl)propane is described by Mirva et al. in Bulletin of the Chemical Society of Japan, Vol. 50, No. 10, pp 2682–2685 (1977). These resins have been shown to undergo reversible thermal degradation in 10 wt. % nitrobenzene solution. A 1 wt. % solution does not show this behavior.

The use of dicyclopentadiene to reversibly cross-link polyisobutylene has been described by Kennedy and Castner in Journal of Polymer Science, Vol. 17, No. 7, page 2039 and page 2055 (1979). However no extension of the technology to the enhancement of the melt flow of thermoplastic resins is suggested.

BRIEF SUMMARY OF THE INVENTION

I have now found that resins, including bisphenol-A polycarbonate, can be synthesized with incorporation of dicyclopentadienyl diradicals within the main polymer chain, as more fully described hereinbelow. The novel structure, even with chains sparsely populated with dicyclopentadienyl diradicals, shows a markedly lower melt viscosity when compared with a conventional bisphenol-A polycarbonate resin of the same intrinsic viscosity. The reduction of melt viscosity, however, causes no ignificant reduction in molecular weight of the cooled resin. Without being bound by theory, the reduction of melt viscosity may be attributed to a retro-Diels Alder reaction in the melt with surprisingly efficient reconstitution of the dicyclopentadienyl diradicals on cooling.

One embodiment of this invention provides a method for manufacturing an improved thermoplastic molding resin by chemically converting a reaction mixture comprising a reactive monomeric bifunctional aryl compound, and recovering a thermoplastic resin having a structure comprising one or more recurring carbonate, ester, ether, or sulfone groups chemically linking hydrocarbon diradicals comprising aromatic diradicals or aromatic and aliphatic diradicals, the improvement, whereby increasing the flow at molding temperature of said thermoplastic resin, which comprises:

including in said reaction mixture an amount of dicyclopentadienyl derivative or precursor thereof, said amount being effective to substantially increase the flow rate of said thermoplastic resin at molding temperature.

Another embodiment of this invention provides a thermoplastic composition comprising polymers selected from the group consisting of aromatic polycarbonates, aromatic copoly(ester carbonate)s, polyarylates, aromatic polyethers, aromatic polyether sulfones, and polyetherimides, having incorporated therein dicyclopentadienyl diradicals in such quantity that the melt viscosity of the polymer is significantly decreased.

DETAILED DESCRIPTION AND BEST MODE

While this invention will be described with particular reference to certain thermoplastic resins generally known to be difficult to mold, viz. the polycarbonates, copoly(ester carbonates), poly(arylene oxides) and aromatic polysulfones, it is contemplated to be applicable more generally to thermoplastic resins having a structure comprising one or more recurring carbonate $$(-O-\overset{O}{\underset{\|}{C}}-O-), \text{ ester } (-\overset{O}{\underset{\|}{C}}-O-),$$

ether (—O—), or sulfone

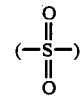

groups that serve to link together unsubstituted or substituted groups in the main chain of the polymer.

The modified synthesis of this invention requires that the resin-forming reaction mixture contain a dicyclopentadienylderivative

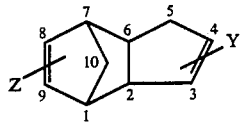

(I)

wherein Z and Y may be the same or different, and Z is attached to carbon atoms 1 or any of carbon atoms 7 to 10 and Y is attached to any carbon atom 2 to 6. Each of Z and Y are individually chosen from the group consisting of carboxylic acid

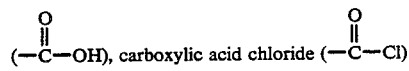

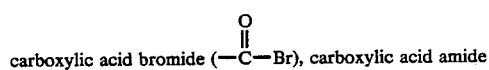

wherein R is methyl, ethyl or phenyl, phenol, and alkylphenol. Also contemplated as operable are dicyclopentadienyl compounds of Formula (I) wherein any hydrogen atom attached to carbon is replaced by a phenyl group, an alkyl group having 1 to 6 carbon atoms, an alkyl substituted phenyl group having 1 to 14 carbon atoms, a fluorine, chlorine or bromine atom, an alkoxy group of 1 to 6 carbon atoms, or a cyano group. Also contemplated as operable are the monomeric precursors of the dicyclopentadienyl structures described above. It is recognized by one skilled in the art that the foregoing Formula (I) may exist as endo- or exo-isomers, and the foregoing description of the dimer applies to either isomer or a mixture of these. The preferred dicyclopentadienyl derivatives for use in the method of this invention are dicyclopentadienyl dicarboxylic acid chloride and dicyclopentadiene dicarboxylic acid. Other dicyclopentadienyl derivatives useful in the method of this invention are reactive linear oligomers such as provided by the diester formed from dicyclopentadienyl dicarboxylic acid and bisphenol-A. (See Example 15.) Such oligomers and their preparations are described in copending application Ser. No. 133,854 filed on even date herewith, incorporated herein by reference. The dicyclopentadienyl radical may also be incorporated by use of low molecular weight oligomers formed by the reaction of the substituted cyclopentadiene dimers described above with the appropriate diphenol, diol, diacid, diamine or their reactive derivatives. See White, D. M. and Loucks, G. R. in "Reactive Oligomers, ACS Symposium series 155N 0097-6156; 282" edited by Harris, F. W. and Spinelli, H. J.; 1985, incorporated herein by reference for background.

In general, the amount of dicyclopentadienyl derivative incorporated in the resin-forming reaction mixture should be that amount which is effective to reduce by at least about 10% the melt viscosity of the resin, compared with a resin of substantially the same intrinsic viscosity (IV) prepared in the absence of said dicyclopentadienyl derivative, said melt viscosity being determined by the Kasha Index (KI) more fully described hereinbelow. In any case, the amount of dicyclopentadienyl diradical incorporated into the polymer backbone is not more than about 15 mole percent based on the major repeat unit(s) in the polymer backbone and preferably in the range of 1.0 to 15 mole percent, with an amount in the range of about 1.0 to about 3.0 mole percent particularly preferred.

Aside from the requirement for incorporation of the dicyclopentadienyl derivative in the resin-forming mixture as described above, the desired type of modified resin is synthesized by methods known to those skilled in the art, said methods per se not constituting part of the present invention.

The modified aromatic polycarbonate resins of this invention can be prepared by reacting a dihydric phenol with a carbonate precursor, such as phosgene, a haloformate or a carbonate ester. Generally speaking, such carbonate polymers possess recurring structural units of the formula:

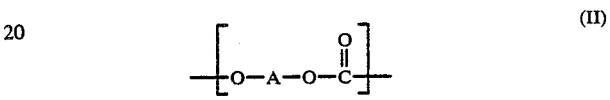

(II)

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.7 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:
2,2-bis(4-hydroxyphenyl)propane;
hydroquinone;
resorcinol;
2,2-bis-(4-hydroxyphenyl)pentane;
2,4'-dihydroxydiphenylmethane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dimethyldiphenyl ether; and the like.

Other dihydric phenols which are also suitable for use in the preparation of the above polycarbonates are disclosed in U.S. Pat. Nos. 2,999,835; 3,028,365; 3,334,154; and 4,131,575.

These modified aromatic polycarbonates can be manufactured by known processes, such as, for example and as mentioned above, by reacting a dihydric phenol with a carbonate precursor, such as phosgene, in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy or acid terminated polyester or with a dibasic acid in the event a modified carbonate copolymer or interpolymer rather than a homopolymer is desired for use in the preparation of the modified polycarbonate of this invention. Branched polycarbonates such as are described in U.S. Pat. No. 4,001,184, also may be modified by the method of this invention. In any event, the preferred aromatic carbonate polymer of this invention is a modified homopolymer derived from 2,2-bis(4-hydroxyphenyl)propane (bisphenol-A).

The modified copoly(ester carbonate) of this invention may generally be described as polymers comprising recurring carbonate groups,

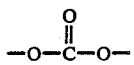

carboxylate groups,

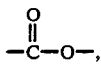

and aromatic carbocyclic groups in the linear polymer chain, in which at least some of the carboxylate groups and at least some of the carbonate groups are bonded directly to ring carbon atoms of the aromatic carboxylic groups. These copoly(ester carbonate) copolymers in general, are prepared by reacting a difunctional carboxylic acid or ester forming derivative, a dihydric phenol and a carbonate precursor.

The dihydric phenols useful in formulating the modified copoly(ester carbonates) for use herein may be represented by the general formula:

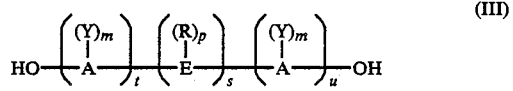

(III)

in which A is an aromatic group such as phenylene, biphenylene, naphthylene, anthrylene, etc. E may be an alkylene or alkylidene group such as methylene, ethylene, propylene, propylidene, isopropylidene, butylene, butylidene, isobutylidene, amylene, isoamylene, amylidene, isoamylidine and generally from one to twelve carbon atoms, inclusive, etc. Where E is an alkylene or alkylidene group, it may also consist of two or more alkylene or alkylidene groups, connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group of 5 to 12 carbon atoms, inclusive (e.g. cyclopentyl, cyclohexyl), or a cycloalkylidene of 5 to 12 carbon atoms inclusive, such as cyclohexylidene, a sulfur containing linkage, such as sulfide, sulfoxide or sulfone; an ether linkage; a carbonyl group; a tertiary nitrogen group, or a silicon containing linkage such as silane or siloxy. Other groups which E may represent will occur to those skilled in the art. R is hydrogen or a monovalent hydrocarbon group such as alkyl of one to eight carbon atoms, inclusive (methyl, ethyl, propyl, etc.), aryl (phenyl, naphthyl, etc.), aralkyl (benzyl, ethylphenyl, etc.) or cycloaliphatic of 5 to 12 carbon atoms, inclusive (cyclopentyl, cyclohexyl, etc.). Y may be an inorganic atom such as chlorine, bromine, fluorine, etc.; an organic group such as R above, or an oxy group such as OR, or C≡N it being only necessary that Y be inert to and unaffected by the reactants and the reaction conditions. The letter m is any whole number from and including zero through the number of positions on A available for substitution; p is any whole number from and including zero through the number of available positions on E; t is a whole number equal to at least one, S is either zero or one, and u is any whole number including zero.

In the dihydric phenol compound represented by Formula III above, when more than one Y substituent is present, they may be the same or different. The same is true for the R substituent. Where s is zero in Formula III and u is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the aromatic hydrocarbon residue are substituted with Y and hydroxyl group.

Examples of dihydric phenol compounds that may be employed in the modified copoly(ester carbonate) of this invention include:
2,2-bis-(4-hydroxyphenyl)propane (bisphenol-A);
2,4'-dihydroxydiphenylmethane;
bis-(2-hydroxyphenyl)methane;
bis-(4-hydroxyphenyl)methane;
bis-(4-hydroxy-5-nitrophenyl)methane;
bis-(4-hydroxy-2,6-dimethyl-3-methoxyphenyl)methane;
1,1-bis-(4-hydroxyphenyl)ethane;
1,2-bis-(4-hydroxyphenyl)ethane;
1,1-bis-(4-hydroxy-2-chlorophenyl)ethane;
1,1-bis-(2,5-dimethyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(4-hydroxynaphthyl)propane;
2,2-bis-(4-hydroxyphenyl)pentane;
3,3-bis-(4-hydroxyphenyl)pentane;
2,2-bis-(4-hydroxyphenyl)heptane;
bis-(4-hydroxyphenyl)phenylmethane;
bis-(4-hydroxyphenyl)cyclohexylmethane;
1,2-bis-(4-hydroxyphenyl)-1,2-bis-(phenyl)propane;
2,2-bis-(4-hydroxyphenyl)-1-phenylpropane; and the like.

Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, etc. Also useful are dihydric phenols wherein E is a sulfur-containing radical such as the dihydroxy aryl sulfones exemplified by: bis-(4-hydroxyphenyl)sulfone; 2,4'-dihydroxydiphenyl sulfone; 5-chloro-2,4'-dihydroxydiphenyl sulfone; 3-chloro-bis-(4-hydroxyphenyl) sulfone; and 4,4'-dihydroxytriphenyl-disulfone; etc. The preparation of these and other useful sulfones are described in U.S. Pat. No. 2,288,282. Polysulfones as well as substituted sulfones using halogen, nitrogen, alkyl radicals, etc. are also useful. Dihydroxy aromatic ethers such as those described in U.S. Pat. No. 3,148,172 are useful as the dihydric phenol herein. The dihydroxy aromatic ethers may be prepared as described in U.S. Pat. No. 2,739,171. Illustrative of such compounds are the following:
4.4'-dihydroxydiphenyl ether;
4,4'-dihydroxytriphenyl ether;
the 4,3'-, 4,2'-, 2,2'-, 2,3'-, etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
4,4'-dihydroxy-3,3'-diisopropyldiphenyl ether;
4,4'-dihydroxy-3,3'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the dihydric phenols can also be employed and where dihydric phenol is mentioned herein, mixtures of such materials are considered to be included.

In general, any difunctional carboxylic acid or its reactive derivative such as the acid halide conventionally used in the preparation of polyesters may be used for the preparation of modified poly(ester carbonate) compositions of the present invention. In general, the carboxylic acids which may be used include the aliphatic carboxylic acids, aliphatic aromatic carboxylic acids, or aromatic carboxylic acids. The aromatic dicarboxylic acids or their reactive derivatives such as the aromatic diacid halides are preferred as they produce the aromatic copoly(ester carbonates) which are most useful, from the standpoint of physical properties, in the practice of the instant invention.

These carboxylic acids may be represented by the general formula:

$$R^2-(R^1)_q-COOH \qquad (IV)$$

wherein $R^1$ represents an alkylene, alkylidene or cycloaliphatic group in the same manner as set out above for E in Formula III; an alkylene, alkylidene or cycloaliphatic group containing ethylenic unsaturation; an aromatic radical such as phenylene, naphthylene, biphenylene, substituted phenylene, etc.; two or more aromatic groups connected through non-aromatic linkages such as those defined by E in Formula III; or a divalent aliphatic aromatic hydrocarbon radical such as an aralkyl or alkaryl radical. $R^2$ is either a carboxyl or a hydroxyl group. The letter q represents the integer one where $R^2$ is a hydroxyl group and either zero or one where $R^2$ is a carboxyl group. Thus the difunctional carboxylic acid will either be a monohydroxy monocarboxylic acid or a dicarboxylic acid. For purposes of the present invention the aromatic dicarboxylic acids or their reactive derivatives such as, for example, the acid halides, are preferred. Thus in these preferred aromatic dicarboxylic acids, as represented by Formula III, $R^2$ is a carboxyl group and $R^1$ is an aromatic radical such as phenylene, biphenylene, naphthylene, substituted phenylene, etc., two or more aromatic groups connected through non-aromatic linkages; or a divalent aliphatic aromatic radical. Some nonlimiting examples of suitable preferred aromatic dicarboxylic acids which may be used in preparing the copolyestercarbonate resins of the instant invention include phthalic acid, isophthalic acid, terephthalic acid, homophthalic acid, o-, m-, and p-phenylenediacetic acid, the polynuclear aromatic acids such as diphenic acid, and 1,4-naphthalic acid. The aromatics may be substituted with Y groups in the same manner as the Formula II aromatics are substituted.

These acids may be used individually or as mixtures of two or more different acids.

The carbonate precursor may be either a carbonyl halide, a carbonate ester, or a haloformate. The carbonyl halides which can be employed herein are carbonyl chlorides or carbonyl bromide. Typical of the carbonate esters which may be employed herein are diphenyl carbonate, di(halophenyl)carbonates such as di(chlorophenyl)carbonate, di(bromophenyl)carbonate, di(trichlorophenyl)carbonate, di(tribromophenyl)carbonate, etc., (dialkylphenyl)carbonate, such as di (tolyl) carbonate, etc., di(naphthyl)carbonate, di(chloronaphthyl)carbonate, phenyltolyl carbonate, chloronaphthyl chlorophenyl carbonate, and the like. The haloformates suitable for use herein include bishaloformates of dihydric phenols such as bischloroformates of hydroquinone, etc. or glycols such as bishaloformates of ethylene glycol, neopentyl glycol, polyethylene glycol, etc. While other carbonate precursors will occur to those skilled in the art, carbonyl chloride, also known as phosgene is preferred.

The preparation of modified copoly(ester carbonate) compositions of the present invention may be conducted by methods described in U.S. Pat. Nos. 3,030,331; 3,169,121; 3,207,814; 4,194,038 and 4,156,069.

The copoly(ester carbonates) which are preferred in the practice of the present invention include the aromatic copoly(ester carbonates) derived from dihydric phenols, aromatic dicarboxylic acids or their reactive ester forming derivatives such as the aromatic diacid halides, and phosgene. A particularly useful class of aromatic copolyestercarbonates is that derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture of isophthaloyl dichloride and terephthaloyl dichloride, and phosgene. The molar proportion of ester units in the copolyestercarbonate is generally from about 25 to 90 mole percent and preferably about 35 to 80 mole percent. The molar range of terephthalate units, the remainder of the copolymer ester units preferably comprising isophthalate units is generally from about 2 to 90 percent, and preferably from about 5 to about 25 percent.

The polyarylates which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following Formula V:

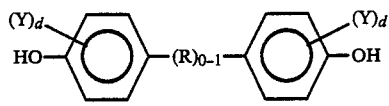

(V)

wherein Y is independently selected from, hydrogen, alkyl groups of 1 to 4 carbon atoms, chlorine or bromine, each d, independently, has a value of from 0 to 4, inclusive, and R is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, CO, $SO_2$ or S. The dihydric phenols may be used individually or in combination. The dihydric phenols that may be used in this invention include the following:

2,2-bis-4-(4-hydroxyphenyl)propane;
bis-(2-hydroxyphenyl)methane;
bis-(4-hydroxyphenly)methane;
bis-(4-hydroxy-2,6-dimethyl-3-methoxypeheny)-methane;
1,1-bis-(4-hydroxyphenyl)ethane;
1,2-bis-(4-hydroxyphenyl)ethane;
1,1-bis-(4-hydroxy-2-chlorophenyl)ethane;
1,3-bis-(3-methyl-4-hydroxyphenyl)ethane;
1,3-bis-(3-methyl-4-hydroxyphenyl)propane;
2,2-bis-(3-phenyl-4-hydroxyphenyl)propane;
2,2-bis-(3-isopropyl-4-hydroxyphenyl)propane;
2,2-bis-(2-isopropyl)-4-hydroxyphenyl)propane;
2,2-bis-(4-hydroxyphenyl)pentane;
3,3-bis-(4-hydroxyphenyl)pentane;
2,2-bis-(4-hydroxyphenyl)heptane;
1,2-bis-(4-hydroxyphenyl)1,2-bis-(phenyl)-propane;
4,4'-(dihydroxyphenyl)ether;
4,4'-(dihydroxyphenyl)sulfide;
4,4'-(dihydroxyphenyl)sulfone;
4,4'-(dihydroxyphenyl)sulfoxide;
4,4'-(dihydroxybenzophenone), and naphthalene dios.

The aromatic dicarboxlic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic and terephthalic acids are used. The isophthalic acid terephthalic acid ratio in the mixture is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids With diester derivatives of the dihydric phenol. These processes are described in, for example, U.S. Pat. Nos. 3,317,464; 3,948,856; 3,780,148; 3,824,214; and 3,133,898, all incorporated herein by reference.

The polyarylates are preferably prepared by the process as set forth in U.S. Pat. No. 4,321,355, incorporated herein by reference. This process comprises the following steps:

(a) reacting an acid anhydride derived from an acid containing from 2 to 8 carbon atoms with at least one dihydric phenol to form the corresponding diester; and, (b) reacting said diesters with at least one aromatic dicarboxylic acid at a temperature sufficient to form the polyarylate, wherein the improvement comprises removing residual acid anhydride after formation of the dihydric phenol diester so that its concentration is less than about 1500 parts per million.

The acid anhydride suitable is derived from an acid containing from 2 to 8 carbon atoms. The preferred acid anhydride is acetic anhydride.

The dihydride phenol is described above.

Generally, the dihydric phenol reacts with the acid anhydride under conventional esterification conditions to form the dihydric phenol diester. The reaction may take place in the presence or absence of a solvent. Additionally, the reaction may be conducted in the presence of a conventional esterification catalyst or in the absence thereof.

U.S. Pat. No. 4,576,842 to Hartsing, column 12, line 39 to column 14, line 5 is incorporated herein by reference.

The modified thermoplastic poly(arylene oxides) useful in the present invention have the general structure:

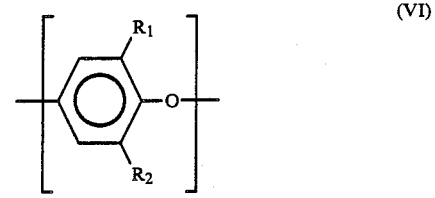

(VI)

wherein either one or both of $R_1$ and $R_2$ may be hydrogen, methyl, methoxy, phenyl, or chlorine. The particularly preferred poly(arylene oxide) is poly(2,6-dimethyl-1,4-phenylene oxide) DMPPO. This modified polymer and many other structures may be prepared by oxidative coupling of 2,6-disubstituted phenol in the presence of copper halide and one or more aliphatic amines or pyridine. Modified DMPPO may also be prepared from 4-bromo-2,6-dimethylphenol in the presence of potassium hydroxide with a free-radical initiator. Kirk-Othmer's *Encyclopedia of Chemical Technology*, 3rd Ed., Vol. 18, pp 595–605 and pertinent references on pp 613–615 are incorporated herein by reference for further description of the manufacture and properties of the poly(arylene oxides).

Aromatic polyethersulfones may be modified by the method of this invention. Such materials are well known in the art and are amply described in the literature including, inter alia, U.S. Pat. No. 3,642,946; Modern Plastics Encyclopedia, 1977–78, pp. 108, 110–112; Kirk-Othmer, Encyclopedia of Chemical Technology, Second Edition, Vol. 16, pp. 272–281 (1968); and Handbook of Plastics ad Elastomers, C. A. Harper, ed., McGraw-Hill, Inc. 1975, pp. 1–69 and 95–96, and in U.S. Pat. No. 4,576,842 to Hartsing et al., columns 3–7, all of which are incorporated herein by reference.

The modified polyarylether sulfones of the present invention contain at least one recurring structural unit represented by the general Formula VII:

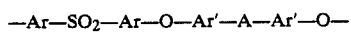

$$-Ar-SO_2-Ar-O-Ar'-A-Ar'-O- \quad (VII)$$

wherein Ar and Ar' are independently selected from the group consisting of phenylene, alkyl-, alkoxy-, halogen-, and nitro-substituted phenylene; and A is selected from the group consisting of carbon-to-carbon bonds, alkylidene, cycloalkylidene, carbonyl sulfoxide, sulfur, sulfone, azo, imino, and oxygen.

The polysulfones of Formula VII are preferably derived from dichlorodiphenyl sulfones reacted with bisphenols. A second group of sulfones represented by Formula VII is where Ar and Ar' are phenylene and A is sulfone. A third major group of polysulfones represented by Formula VII are those wherein Ar and Ar' are phenylene and A is oxygen, i.e., the polyarylethersulfones. When Ar is phenylene, it should preferably be either meta or para and may be substituted in the ring positions with alkyl groups such as methyl, ethyl, and propyl. The alkoxy groups may be groups such as methoxy and propoxy. Particularly useful polysulfones are those derived from disulfonyl chlorides such as 4,4-biphenyldisulfonyl chloride reacted with diphenyl ether.

The modified polysulfones of the present invention may be prepared in a variety of ways such as by nuoleophilic aromatic substitution which is described in the Journal of Polymer Science, Part A 15, 2375? 98 (1967) or by condensation procedures which are described in British Patent No. 1,060,546, both of which are incorporated herein by reference.

The modified polyarylethersulfones contain at least the following recurring structural units:

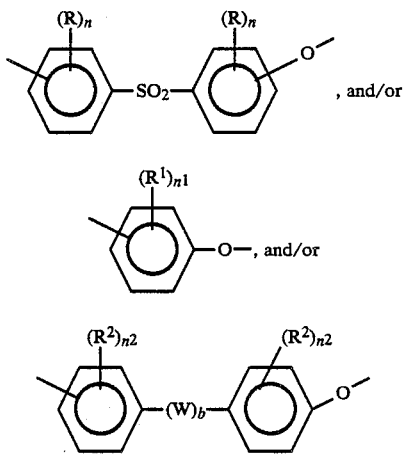

wherein R, $R^1$ and $R^2$ are independently selected from $C_1$–$C_6$ alkyl, $C_4$–$C_8$ cycloalkyl, and halogen radicals; W is a $C_2$–$C_8$ alkylene, a $C_1$–$C_8$ alkylidene, a cycloalkylene or cycloalkylidene radical containing from 4 to about 16 ring carbon atoms; b is either zero or one; and n, $n^1$ and $n^2$ are independently selected from integers having a value of from 0 to 4 inclusive.

A particularly useful modified polyarylethersulfone is one which contains at least one recurring structural unit represented by Formula VIII:

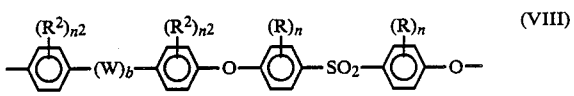

wherein $R^2$, R, W, b, n and $n^2$ are as defined hereinafore. Particularly useful modified polyarylethersulfones of Formula VIII are those wherein b is one and W is an alkylidene radical, preferably the isopropyildene radical. Of these types of polyarylethersulfones those wherein n and $n^2$ are zero are particularly useful. The preparation of these polyarylethersulfones, as well as the modified resins themselves, may be conducted as described in U.S. Pat. No. 4,503,168, incorporated herein by reference.

The compositions of this invention may contain other components such as stabilizers, flame retardants, mold release agents, foaming agents, pigments, other thermoplastic resins and rubbery impact modifiers.

The compositions of this invention may also contain fillers and reinforcing fibers such as, for example, glass and carbon. The fillers may include, for example, silica, talc, clay, mica, calcium sulfate and calcium carbonate. The amount of such additives present is dependent upon the desired effect and it is within the knowledge of those skilled in the art to determine the appropriate amounts.

The polymers of this invention may be blended with other resins such as polymethylmethacrylate, polyethylene, polypropylene, polyvinyl chloride, polystryene, acrylonitrile-butadiene-styrene terpolymer, styrene-acrylonitrile copolymer, acrylate-styreneacrylonitrile terpolymer, and other impact modified versions of these polymers.

Preparation of the blends of this invention may be accomplished by any conventional blending technique such as, for example, dry blending, melt blending, solution blending and the like. Melt blending may be accomplished in a conventional extruder, from which the admixture may be molded into a part of specific dimensions or further extruded to a film or sheet.

EXAMPLES

The examples which follow are given for illustrative purposes and are not intended to limit the scope of this invention, which scope is determined by this entire specification including the appended claims.

All references in the specification and examples to "Intrinsic Viscosity" (IV) refer to the value measured at 30° C. in dichloromethane, unless explicitly stated to be otherwise.

All references in the specification and examples to "melt viscosity" refer to the melt viscosity as measured by the Kasha Index (KI). The KI of a resin is a measurement of its melt viscosity and is obtained in the following manner: 7 grams of resin, dried a minimum of 90 minutes at 125° C., are added to a modified TiniusOlsen Model T3 melt indexer; the temperature in the indexer is maintained at 300° C. and the resin is heated at this temperature for 6 or 12 minutes. After 6 or 12 minutes, the resin is forced through a 0.1048 cm radius orifice using a plunger of radius 0.4737 cm and an applied force of 78.7 N. The time required for the plunger to travel two inches is measured in centiseconds; that required time is reported as the KI.

EXAMPLE 1

This example illustrates the synthesis of bisphenol-A polycarbonate resin in which the chains are sparsely polulated with dicyclopentadienyl diradicals.

A 2 L four neck flask was fitted with a mechanical stirrer, a pH probe, a gas inlet tube and a Claisen adapter to which was attached a dry ice condenser and an aqueous caustic inlet tube. To the flask was added methylene chloride (340 ml), $H_2O$ (280 ml), bisphenol-A (54.3 g, 0.238 mole), triethyl amine (1.4 ml 0.01 mole), phenol (0.70 g, 0.007 mole), and dicyclopentadiene dicarboxylic acid (2.75 g, 0.0125 mole). This mixture was phosgenated at 1 g/min at pH 5.0–5.5 for 5 minutes. The pH was raised to 10.0–10.5 and phosgenation continued for a total of 30 minutes. pH was controlled by addition of 25% NaOH. After a 10 minute nitrogen purge to remove excess phosgene, the organic phase was washed with dilute HCl and water to obtain a pH 7 organic phase. After drying with $MgSO_4$ the solution was precipitated into 2 1 of methanol and dried in a 125° C. oven overnight.

EXAMPLE 2

Prepared as in Example 1, using 54.3 g (0.238 mole) of bisphenol-A, 2.75 g (0.0125 mole) of dicyclopentadiene dicarboxylic acid, and 0.47 g (0.005 mole) of phenol.

EXAMPLE 3

Prepared as in Example 1, using 54.3 g (0.238 mole) of bisphenol-A, 2.75 g (0.0125 mole) of dicyclopentadiene dicarboxylic acid, and 0.59 g (0.006 mole) of phenol.

EXAMPLE 4

Prepared as in Example 1, using 54.3 g (0.238 mole) of bisphenol-A, 2.75 g (0.0125 mole) of dicyclopentadiene dicarboxylic acid, and 0.59 g (0.006 mole) of phenol.

EXAMPLE 5 (Control)

Polycarbonates without dicyclopentadiene were prepared for comparison purposes as follows:

A 2 L four neck flask was fitted with a mechanical stirrer, a pH probe, a gas inlet tube and a Clasien adapter to which was attached a dry ice condenser and an aqueous caustic inlet tube. To the flask was added methylene chloride (340 ml), $H_2O$ (280 ml), bisphenol-A (57.0 g, 0.250 mole), triethyl amine (0.75 ml, 0.005 mole), and varying amounts of phenol (0.5 to 1.1 g). Phosgene (30.0 g, 0.30 mole) was then added at 1 g/min for 30 minutes with pH controlled between 10–10.5. After a 10 minute nitrogen purge to remove excess phosgene, the organic phase was washed once with 250 ml of 1% HCl followed by three washes with 300 ml water to obtain a pH 7 organic phase. After drying with $MgSO_4$ the solution was precipitated into 1500 ml MeOH and dried in a 125° C. oven overnight.

For each of the products from Examples 1–5 the intrinsic viscosity in dichloromethane at 30° C. was measured, the melt viscosity (KI) determined, and the intrinsic viscosity and glass transition temperature of the sample recovered from the KI determination was determined. The data are summarized in Table I.

TABLE I

| | IMPROVED MELT FLOW POLYMERS | | | | |
|---|---|---|---|---|---|
| | wt %[a] | IV of Polymer | | | Having | Improve- |
| Ex No. | DCC | as formed | after KI | KI | Same IV | ment |
| 1 | 2.0 | .446 | .441 | 1300 | 1700 | 24% |
| 2 | 1.2 | .523 | .453 | 1100 | 2000 | 43% |
| 3 | 1.5 | .503 | .559 | 2700 | 5700 | 53% |
| 4 | 1.5 | .503 | .514 | 2600 | 3900 | 34% |
| 10 | 1.4 | .494 | .482 | 1700 | 2900 | 42% |

[a]Determined by infrared analysis.
[b]As prepared in Example 5 with various levels of phenol chain terminator and no dicyclopentadiene dicarboxylic acid incorporated into the polymer. Presence of dicylopentadiene dicarboxylate (DCC) units in the polymer improves flow (i.e. reduces KI) over that expected for a similar molecular weight polymer (same intrinsic viscosity) with no DCC units.

| Tg of Polymer °C. | |
|---|---|
| as formed | after KI |
| 149 | 147 |
| 153 | 150 |
| 153 | 151 |
| 153 | 152 |
| 147 | 146 |

EXAMPLE 6

This example illustrates the preparation of a copoly(ester carbonate) having dicyclopentadiene dicarboxylate units in the chain.

A 1 L four neck flask was fitted with a mechanical stirrer, a pH probe, a gas inlet tube and a Claisen adapter to which was attached a dry ice condenser and an aqueous caustic inlet tube. To the flask was added methylene chloride (325 ml), $H_2O$ (275 ml), bisphenol-A (40.0 g, 0.175 mole), triethyl amine (0.75 ml, 0.005 mole), para-tert-butyl phenol (0.79 g, 0.006 mole), and dicyclopentadiene diacid chloride. This mixture was stirred at pH 9 for 5 minutes. Iso/Tere-phthaloyl chloride (25.9 g, 0.128 mole, 93/7 iso:tere ratio) dissolved into 50 ml methylene chloride and added to the 1L flask over 6 minutes with pH controlled at 9.0–9.5. Phosgene (10.0 g, 0.1 mole) was then added a 1 g/min for 10 minutes with pH controlled at 10. After a 10 minute nitrogen purge to remove excess phosgene, the organic phase was washed with 1% HCl followed by water washes to obtain a pH 7 organic phase. After drying with $MgSO_4$ the solution was precipitated into 1500 mL MeOH and dried in a 125° C. oven overnight. The intrinisc viscosity in dichloromethane was 0.481. KI of cut up films containing 0.5% octadecyl 3-(3′,5′-di-tert-butyl-4′-hydroxyphenyl) propionate was 3570. The intrinsic viscosity of the recovered material from the KI evaluation was 0.562. A polyester polycarbonate resin (control) containing 75% (mole) iso/tere phthalate was synthesized in the same manner except no dicyclopentadiene diacid chloride and 0.92 g of para-tert-butyl phenol were used. The IV was 0.479 and the KI of cut up films containing 0.5% octadecyl 3-(3′,5′-ditert-butyl4′-hydroxyphenyl)propionate was 15090. The intrinsic viscosity of the recovered material from the KI evaluation was 0.442.

EXAMPLE 7

Examples 7 and 8 illustrate the use of reactive oligomers to incorporate the dicyclopentadienyl moiety in the main chain. See White, D. M. and Loucks, G. R. hereinabove incorporated by reference for background.

Polyphenylene oxide containing the dicyclopentadienyl moiety can be prepared in the following manner. A jacketed blender may be equipped with a nitrogen inlet, thermocouple and septum port and charged with a suitable solvent and the polymer resulting from reaction of oligomers of poly(2,6-dimethyl-1,4-phenylene oxide) and 3,3',5,5'-tertramethyl-4,4'-diphenoquinone. Water at the desired reaction temperature will be circulated through the blender jacket. A quarternary ammonium halide will then be added followed by aqueous sodium hydroxide. After high speed mixing for several minutes, dicyclopentadiene diacid chloride will be added in one portion. After maintenance of high shear conditions for several minutes, the reaction mixture will be diluted with toluene, acidified and precipitated with methanol. The dicyclopentadienyl-containing polyphenylene ether will be recovered by filtration.

EXAMPLE 8

Polyarylethersulfones containing the dicyclopentadienyl moiety can be prepared as in Example 7 with oligomers of polyarylethersulfone used instead of the oligomer described in Example 7.

EXAMPLE 9

Example 9 illustrates the preparation of polyarylate resins incorporating the dicyclopentadienyl diradicals.

A solution of bisphenol-A and sodium hydroxide in water is prepared in a blender. A small quantity of a surface reactive reagent is added. A second solution of isophthaloyl chloride terephthaloyl chloride and dicyclopentadiene diacid chloride in chloroform is rapidly added to the first solution which is blended very rapidly. After stirring for several minutes the blending is stopped. The mixture is poured into acetone to coagulate the polymer and extract the solvents. The polymer is filtered and washed with acetone and with water. After drying in a vacuum oven the dicyclopentadienyl-containing polyarylate polymer is recovered.

EXAMPLE 10

This example illustrates the preparation of a linear oligomer of bisphenol-A esterified with dicyclopentadiene dicarboxylic acid, and the use of the linear oligomer to incorporate the dicyclopentadienyl moiety in a polycarbonate resin. The oligomer is prepared by reaction of a cyclic polycarbonate oligomer with cyclopentadienyl sodium salt. The cyclic oligomer may be prepared as described in U.S. Pat. No. 4,644,053 to Brunelle et al., incorporated herein by reference.

A 1 L four neck flask was fitted with a mechanical stirrer, thermometer, addition funnel, and a condenser connected to a positive pressure of argon and charged with tetrahydrofuran (500 ml) and sodium hydride (5.94 g, 0.248 mole) from a 60% oil dispersion. Cyclopentadiene (13.0 g, 0.197 mole) was rapidly added to the Na/THF mixture. The temperature rose to 35° C. with foaming and concomitant red color formation. The foaming stopped and temperature cooled to 25° C. in approximately 15 minutes. A solution of cyclic polycarbonate (50.0 g, 0.197 mole) in tetrahydrofuran (500 ml) was rapidly added. After 4 hours, 250 ml of the reaction mixture was added to 100 ml 5% HCl, shaken and washed with 10% sodium bicarbonate. After drying with magnesium sulfate, and removal of solvent in vacuo, 15.0 g of yellow material remained.

A 1 L four neck flask was fitted with a mechanical stirrer, a pH probe, a gas inlet tube and a Claisen adapter to which was attached to a dry ice condenser and an aqueous caustic inlet tube. To the flask was added methylene chloride (340 ml), H$_2$O (280 ml), bisphenol-A (35.0 g, 0.154 mole), triethyl amine (1.1 ml), phenol (0.47 g, 0.005 mole), and 10.0 g of the cyclopentadiene/polycarbonate oligomer synthesized above. Phosgene (10.0 g, 0.1 mole) was then added at 1 g/min for 10 minutes with pH controlled at 8–10. After a 10 minute nitrogen purge to remove excess phosgene, the organic phase was washed once with 1% HCl followed by three washes with 300 ml water. After drying with MgSO$_4$ the solution was precipitated into 1500 ml MeOH and dried in a 125° C. oven overnight. The intrinsic viscosity in dichloromethane was 0.494. KI was 1660. The intrinsic viscosity of the recovered material from the KI evaluation was 0.482.

What is claimed is:

1. In the method for manufacturing a thermoplastic molding resin by chemically converting a reaction mixture comprising a reactive monomeric bifunctional aryl compound, and recovering a thermoplastic resin having a structure comprising one or more recurring carbonate, ester, ether, or sulfone groups chemically linking hydrocarbon diradicals comprising aromatic diradicals or aromatic and saturated aliphatic diradicals, the improvement, which comprises:

including in said reaction mixture an amount of dicyclopentadienyl derivative which becomes incorporated with the polymer backbone, said amount being effective to substantially increase the flow rate of said derivative thermoplastic resin at molding temperature.

2. The method of claim 1 wherein said dicyclopentadienyl derivative is dicyclopentadiene dicarboxylic acid or dicyclopentadiene dicarboxylic acid chloride.

3. The method of claim 1 wherein said dicyclopentadienyl derivative is a reactive linear oligomer of a dihydric phenol carbonate.

4. The method of claim 3 wherein said reactive oligomer is prepared by reacting an alkali metal salt of cyclopentadiene with a cyclic polycarbonate oligomer.

5. A thermoplastic composition comprising polymers selected from the group consisting of aromatic polycarbonates, aromatic copoly(ester carbonate)s, polyarylates, poly(arylene oxide)s and aromatic polyether sulfones, said polymer having incorporated therein dicyclopentadienyl diradicals in such quantity that the melt viscosity of the polymer is significantly decreased.

6. The thermoplastic composition of claim 5 containing up to about 15 mole percent of dicyclopentadienyl diradicals incorporated into the polymer.

7. The thermoplastic composition of claim 5 containing about 1.0 to 3.0 mole percent of dicyclopentadienyl radicals incorporated into the polymer.

8. The composition described in claim 5 wherein said polymer is an aromatic polycarbonate.

9. The composition described in claim 8 wherein said polymer is a bisphenol-A polycarbonate.

10. The composition described in claim 5 wherein said polymer is a copoly(ester carbonate).

11. The composition described in claim 10 wherein said copoly(ester carbonate) is the copoly(ester carbonate) of bisphenol-A.

12. The composition described in claim 5 wherein said polymer is a polyarylate.

13. The composition described in claim 5 wherein said polymer is a poly(arylene oxide).

14. The composition described in claim 5 wherein said polymer is an aromatic polyether sulfone.

15. The composition described in claim 5 wherein said dicylopentadienyl radical is derived from dicyclopentadiene dicarboxylic acid or acid chloride.

* * * * *